United States Patent
Oriakhi

(10) Patent No.: US 7,615,111 B2
(45) Date of Patent: Nov. 10, 2009

(54) METALLIC INKJET INK AND METHOD FOR FORMING THE SAME

(75) Inventor: Christopher O. Oriakhi, Corvallis, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 11/736,762

(22) Filed: Apr. 18, 2007

(65) Prior Publication Data

US 2008/0257211 A1    Oct. 23, 2008

(51) Int. Cl.
  *C09D 11/02* (2006.01)
  *B41J 2/01* (2006.01)

(52) U.S. Cl. ............ 106/31.27; 106/31.32; 106/31.6; 106/31.64; 106/31.9; 106/31.92; 347/100

(58) Field of Classification Search ........... 106/31.27, 106/31.32, 31.6, 31.64, 31.9, 31.92; 252/514; 347/100
See application file for complete search history.

(56) References Cited

U.S. PATENT DOCUMENTS

| | | | |
|---|---|---|---|
| 5,091,003 A * | 2/1992 | Boaz | 106/31.05 |
| 5,501,150 A * | 3/1996 | Leenders et al. | 101/466 |
| 6,691,610 B1 | 2/2004 | Wilen | |
| 2005/0078158 A1 | 4/2005 | Magdassi et al. | |
| 2005/0214666 A1 | 9/2005 | Schulze-Hagenest et al. | |
| 2006/0130700 A1 | 6/2006 | Reinartz | |
| 2006/0189113 A1 * | 8/2006 | Vanheusden et al. | 438/597 |
| 2007/0190298 A1 * | 8/2007 | Hampden-Smith et al. | 428/204 |
| 2007/0278422 A1 * | 12/2007 | Einhorn et al. | 250/462.1 |
| 2007/0281136 A1 * | 12/2007 | Hampden-Smith et al. | 428/195.1 |
| 2007/0281140 A1 * | 12/2007 | Haubrich et al. | 106/31.27 |
| 2007/0281177 A1 * | 12/2007 | Haubrich et al. | 428/457 |
| 2008/0043085 A1 * | 2/2008 | Einhorn et al. | 347/106 |

* cited by examiner

*Primary Examiner*—Helene Klemanski

(57) ABSTRACT

A metallic inkjet ink includes a silver metallic colorant, another colorant and at least one ink vehicle. The other colorant is selected from a pigment, a dye, and combinations thereof. Also disclosed herein is a method of forming the metallic inkjet ink including providing an ink vehicle, adding the silver colorant to the ink vehicle, and adding the other colorant to the ink vehicle.

20 Claims, 1 Drawing Sheet

METALLIC INKJET INK AND METHOD FOR FORMING THE SAME

BACKGROUND

The present disclosure relates generally to inkjet inks and method(s) for forming the same.

Metallic inks often include a metal dispersed in an ink vehicle. One attribute of such a metallic ink is its electrical conductivity. As such, metallic ink may be used as a coating material for electrical devices, such as, for example, solar cells, flat panel displays, touch screens, printed circuit boards, flexible circuit boards, thin films, plastic films, radio frequency identification (RFID) tags, organic semiconductors, and organic light-emitting diodes (OLEDs). Another attribute of metallic inks is its tendency to shine when exposed to light. Thus, metallic inks may be useful in printing processes for forming printed images exhibiting a metallic luster (e.g., decorative applications, such as greeting cards, scrap books, brochures, sign boards, business cards, certificates, and other like applications).

The metals used (e.g., gold, palladium, or platinum) to manufacture metallic inks may be costly, and as such, may be economically impractical for commercialization, especially in the printing industry. Other metals have a tendency to fade or lose their metallic luster over time. Furthermore, some metals (e.g., copper) are reactive to various elements in the environment (e.g., air) and have a tendency to lose their electrical conductivity.

Other metallic inks have been derived from metallized organic pigments, metallized aluminum slurries/dispersions, pearlescent pigments, or other non-metallic solutions that exhibit metallic colors. Such inks are generally not made of true metals, and thus may exhibit a relatively dull color. Furthermore, such inks may require large pigment particle sizes (e.g., greater than 5 microns) in order to achieve a desirable metallic effect, and/or may have relatively high viscosities.

BRIEF DESCRIPTION OF THE DRAWINGS

Features and advantages of embodiments of the present disclosure will become apparent by reference to the following detailed description and drawings.

DETAILED DESCRIPTION

Figure 1:
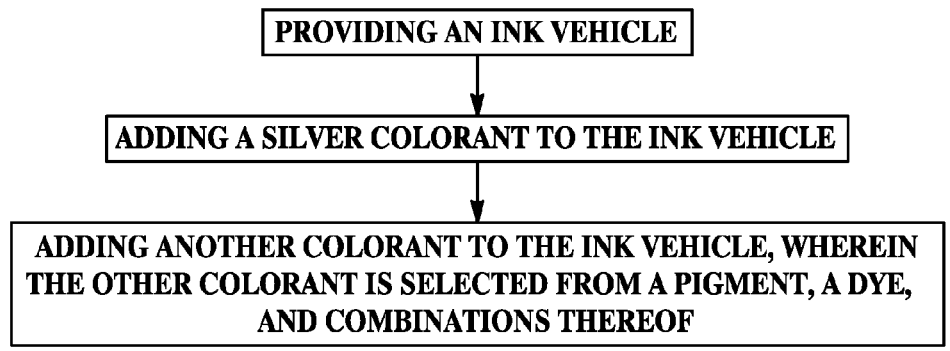
FIG. 1 is a flow diagram depicting an embodiment of the method for forming an embodiment of the metallic ink composition.

Embodiment(s) of the inkjet ink and the method of forming the inkjet ink as disclosed herein advantageously use silver colorants or ink to form other metallic-colored inks, such as, for example, gold, copper, chrome, shining black, bronze, or the like. Metallic silver or a silver nanoparticles dispersion may be used to form the other metallic-colored inks. The resultant ink is suitable for use in inkjet printing processes to substantially reliably produce printed inkjet images having relatively high levels of metallic luster. In some instances, the resultant ink may also be less toxic than, for example, inks formulated with relatively toxic copper ions. The inkjet inks disclosed herein may be more cost effective to manufacture, thereby making metallic inks more affordable for the consumer.

Without being bound by any theory, it is believed that the combination of a silver metallic ink with another ink produces a synthetic metallic-colored ink suitable for use in inkjet printing. Embodiments of the inkjet ink composition disclosed herein include a silver metallic colorant, another colorant, and at least one ink vehicle. The other colorant is selected from a pigment, a dye, and combinations thereof.

It is to be understood that the metallic ink disclosed herein may be formed via any suitable method. In the embodiment shown in FIG. 1, the silver metallic colorant and the other colorant are each added (either simultaneously or sequentially) to an ink vehicle to form the metallic ink composition. In another embodiment (shown in FIG. 2), the silver and other colorants are mixed together prior to adding an ink vehicle thereto. In still another embodiment (shown in FIG. 3), the silver metallic colorant is added to a first ink vehicle to form a silver ink, and the other colorant is added to a second ink vehicle to form another ink. The silver ink and the other ink are then added together to form the ink composition. It is to be understood that the various embodiments of the method will be discussed further hereinbelow with respect to FIGS. 1-3.

In any of the embodiments disclosed herein, the silver metallic colorant may be a metallic silver pigment, generally provided in either a powder or a liquid form, or a water-based dispersion of silver nanoparticles. It is to be understood that when the term "colorant" is used, it means pigment(s), nanoparticles dispersion(s) and/or combinations thereof.

The silver nanoparticles generally include pure silver metal, an alloy of silver, or a combination of metals including silver as one of the metals in the combination. The silver nanoparticles may generally be produced by chemically forming silver colloids or silver ions from a silver salt (non-limiting examples of which include silver acetate, silver nitrate, silver nitrite, silver chlorate, and/or the like, and/or combinations thereof). The silver ions are then reduced to elemental silver in the presence of a reducing agent. Non-limiting examples of suitable reducing agents include ascorbic acid, hydrazine, sodium borohydride, sodium citrate, formaldehyde, ethylene glycol, and the like. In some embodiments, the silver ions are reduced in the presence of polymeric dispersing aids, in addition to the reducing agent. In other embodiments, glycol-based solutions of the silver salt are reduced to the nanoparticles in the presence of polyvinyl pyrrolidone, polyvinyl sulfonate, and/or citrate salt.

The other colorant for the inkjet ink composition is selected from pigment(s), dye(s), or a combination of pigment(s) and dye(s). As non-limiting examples, the other colorant is selected from yellow pigment and/or dye, magenta pigment and/or dye, cyan pigment and/or dye, black pigment and/or dye, and combinations thereof.

Non-limiting examples of suitable pigments for the yellow colorant include pigment yellow 1, pigment yellow 2, pigment yellow 3, pigment yellow 13, pigment yellow 16, pigment yellow 83, pigment yellow 74, pigment yellow 138, pigment yellow 158, pigment yellow 128, pigment yellow 151, pigment yellow 213, pigment yellow 93, pigment yellow 155, pigment yellow 110, pigment yellow 150, acid yellow 3, acid yellow 23, direct yellow 86, CARTASOL® Yellow GTF Liquid Special 110 manufactured by Sandoz, Inc., Princeton, N.J., Yellow Shade 16948 manufactured by Sensient Technologies Corporation, Milwaukee, Wis., and/or the like, and/or combinations thereof. Examples of suitable dyes for the yellow colorant include, but are not limited to, AY-17, DY-132, DY-11, DY-12, Y-104, and/or combinations thereof.

Non-limiting examples of suitable pigments for the magenta colorant include pigment red 5, pigment red 7, pigment red 12, pigment red 48, pigment red 48, pigment red 57, pigment violet 19, pigment red 112, pigment red 122, and/or the like, and/or combinations thereof. Examples of suitable dyes for the magenta colorant include, but are not limited to, acid red 52, acid rhodamine B, reactive red 180, acid red 289, acid red 249, M-377, and/or combinations thereof.

Non-limiting examples of suitable pigments for the cyan colorant include pigment blue 1, pigment blue 2, pigment blue 3, pigment blue 15:3, pigment blue 15:4, pigment blue 16, pigment blue 22, vat blue 4, vat blue 6, and/or the like, and/or combinations thereof. Examples of suitable dyes for the cyan colorant include, but are not limited to, AB-9, DB-199, and/or combinations thereof.

Non-limiting examples of suitable pigments for the black colorant include Raven® 7000, Raven® 5750, Raven® 5250, Raven® 5000, and Raven® 3500 (all of which are commercially available from Columbian Chemicals, Co. located in Marietta, Ga.). Other examples of suitable black pigments include Color Black FW 200, Color Black FW 2, Color Black FW 2V, Color Black FW 1, Color Black FW 18, Color Black S 160, Color Black S 170, Special Black 6, Special Black 5, Special Black 4A, Special Black 4 (all of which are commercially available from Degussa Corp. located in Parsippany, N.J.), and self-dispersed black pigments such as Cabo-Jet® 200 and Cabo-Jet® 300, manufactured by Cabot Corporation, located in Bellrica, Mass. Examples of suitable dyes for the black colorant include, but are not limited to, water soluble metal complex azo dyes such as Reactive Black 31 and Reactive Black 8, water soluble polyazo dyes such as Direct Black 19, Direct Black 195, and Direct Black 168, water soluble sulfur dyes such as Solubilized Sulfur Black 1, materials such as carbon black or derivatives of carbon black, graphite, graphite oxide, and pRB31.

The term "ink vehicle," as defined herein, refers to the combination of water and solvents (and additives, if desired) to form a vehicle in which a colorant is placed to form an ink composition. Suitable additives may include, but are not limited to surfactants, polymers, buffers, biocides, sequestering agents, viscosity modifiers, surface-active agents, and/or mixtures thereof. In an embodiment, the ink vehicle combined with the silver metallic colorant and/or the other colorant to form the ink composition of the present disclosure includes at least one solvent, at least one surfactant, and water. In some embodiments, the ink vehicle of the metallic ink composition is a single ink vehicle (e.g., water, solvent(s), etc.) added to the colorants, or into which the colorants are added. In other embodiments, two or more vehicles (e.g., respective ink vehicles of the silver ink and of the other ink) are added together to form the ink vehicle for the metallic ink composition.

As previously stated, embodiments of the metallic ink composition disclosed herein include one or more solvents. Non-limiting examples of suitable solvents include 2-pyrrolidone, glycerin, isopropyl alcohol, 1,5-pentanediol, 1,6-hexanediol, tetraethylene glycerol, diethylene glycol, 2-aminopropanol, neopentyl alcohol, ethoxylated glycerol, and/or combinations thereof. In an embodiment, the ink vehicle includes at least one solvent present in an amount ranging from about 5 wt % to about 25 wt %.

In a non-limiting example that may be particularly suitable for use with pigment and/or dye based silver metallic colorants, the solvents of the ink composition include diethylene glycol present in an amount ranging from about 3 wt % to about 7 wt %, 2-pyrrolidone present in an amount ranging from about 5 wt % to about 9 wt %, isopropyl alcohol present in an amount ranging from about 2 wt % to about 6 wt %, and 2-aminopropanol present in an amount ranging from about 1 wt % to about 3 wt %. In another non-limiting example that may be particularly suitable for use with a silver nanoparticle dispersion, the solvents of the ink composition include glycerin present in an amount ranging from about 4 wt % to about 10 wt %, 2-pyrrolidone present in an amount ranging from about 6 wt % to about 8 wt %, isopropyl alcohol present in an amount ranging from about 4 wt % to about 5 wt %, and 2-aminopropanol present in an amount ranging from about 1.5 wt % to about 3.5 wt %. In yet another non-limiting example that may be particularly suitable for use with silver nanoparticles dispersion, the solvents of the ink composition include isopropyl alcohol present in an amount ranging from about 1.5 wt % to about 2.5 wt %, glycerin in an amount ranging from about 4 wt % to about 6 wt %, 2-pyrrolidone present in an amount ranging from about 6 wt % to about 8 wt %, and neopentyl alcohol present in an amount ranging from about 1.5 wt % to about 2.5 wt %.

It is to be understood that the non-limiting example formulations are suitable for use with any of the colorants disclosed herein. It is to be further understood that the formulations may be altered to optimize the ink vehicle for a particular colorant or colorant combination.

Surfactants are included in the ink composition, for example, to assist in controlling the physical properties of the ink, such as jetting stability, waterproofness and bleeding. Non-limiting examples of suitable surfactant(s) are generally nonionic or anionic, and may be a water-soluble organic ether or alcohol. Several commercially available nonionic surfactants may be used in the formulation of the metallic ink, examples of which include ethoxylated alcohols such as those from the Tergitol® series (e.g., Tergitol® 15S5, Tergitol® 15S7), manufactured by Union Carbide, located in Houston, Tex.; surfactants from the Surfynol® series (e.g. Surfynol® 104, Surfynol® 440 and Surfynol® 465), manufactured by Air Products and Chemicals, Inc., located in Allentown, Pa.; fluorinated surfactants, such as those from the Zonyl® family (e.g., Zonyl® FSO and Zonyl® FSN surfactants), manufactured by E.I. duPont de Nemours Company, located in Wilmington, Del.; fluorinated PolyFox® nonionic surfactants (e.g., PG-154 nonionic surfactants), manufactured by Omnova, located in Fairlawn, Ohio; 2-diglycol surfactants, such as 1,2 hexanediol or 1,2-octanediol; dodecyl octaethyleneglycol monoether; or combinations thereof.

Suitable anionic surfactants that may be used in the metallic ink composition include surfactants of the Dowfax® family (e.g., Dowfax® 8390), manufactured by Dow Chemical Company, located in Midland, Mich., or anionic Zonyl® surfactants (e.g., Zonyl® FSA), manufactured by E.I. duPont de Nemours Company; sodium dodecyl sulfate; or combinations thereof.

In an embodiment, the ink vehicle of the metallic inkjet ink that is compatible with pigment and/or dye-based silver colorants includes at least one surfactant present in an amount ranging from about 0.3 wt % to about 0.7 wt %. In another embodiment, the ink vehicle of the metallic inkjet ink that is compatible with silver nanoparticle colorants includes at least one surfactant present in an amount ranging from about 0.1 wt % to about 1 wt %.

Additives may be incorporated into any of the embodiments of the ink composition of the present disclosure. As used herein, the term "additives" refers to constituents of the ink that operate to enhance performance, environmental effects, aesthetic effects, or other similar properties of the ink. Examples of additives include buffers, biocides, sequestering agents, chelating agents, or the like, or combinations thereof.

The ink vehicle(s) for the metallic ink composition is aqueous and, therefore, the balance of the ink vehicle includes water.

Referring now to FIG. 1, the silver metallic colorant and the other colorant are added to the ink vehicle to form the metallic inkjet ink. In one embodiment, the silver metallic colorant and the other colorant are added to the ink vehicle simultaneously. In an embodiment, the silver metallic colorant may be added to the ink vehicle prior to adding the other colorant to the same ink vehicle. In yet another embodiment, the other colorant may be added to the ink vehicle prior to the addition of the silver metallic colorant to the ink vehicle.

Figure 2:
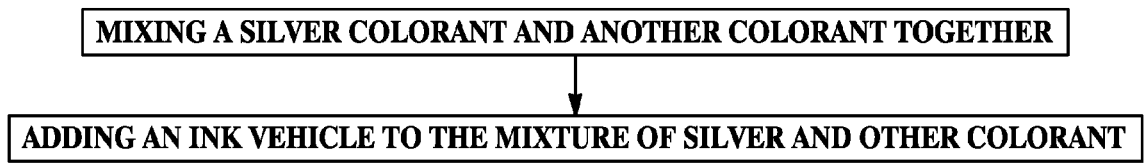
FIG. 2 is a flow diagram depicting another embodiment of the method for forming an embodiment of the metallic ink composition.

FIG. 2 depicts still another embodiment of the method of forming the metallic inkjet ink. In this embodiment, the silver colorant and the other colorant are mixed together prior to being added to (or having added thereto) the ink vehicle. The ink vehicle is then added to the mixture of silver and other colorants to form the metallic ink.

Figure 3:
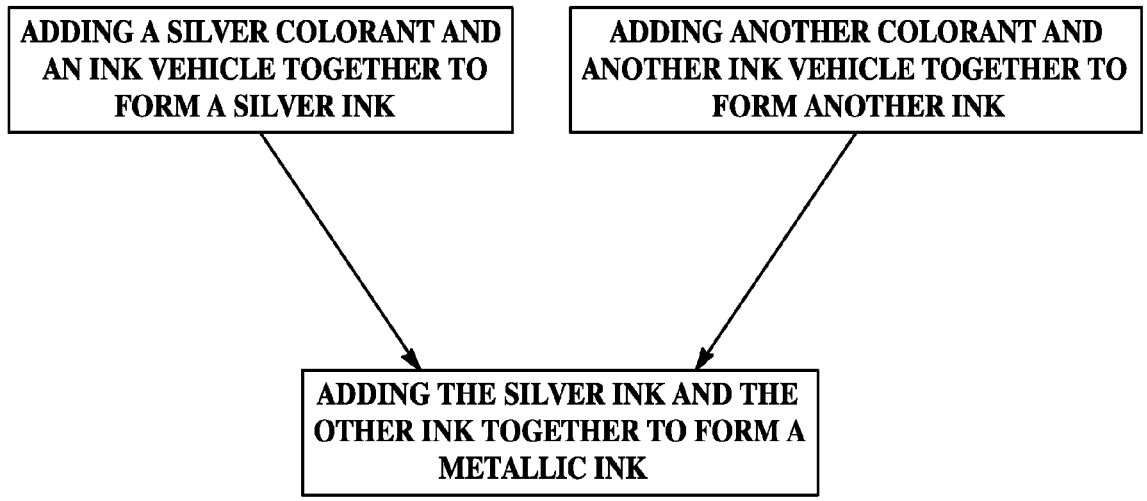
FIG. 3 is a flow diagram depicting still another embodiment of the method for forming an embodiment of the metallic ink composition.

Referring now to FIG. 3, yet another embodiment of the method of forming the metallic inkjet ink is shown. This embodiment is similar to that shown in FIG. 1, except the other colorant is added to another vehicle prior to its addition to the ink vehicle into which the silver colorant is added. In other words (and as shown in FIG. 3), the silver metallic colorant is added to the ink vehicle to form a silver ink. The other colorant is added to another ink vehicle to form the other ink (e.g., a yellow ink, a magenta ink, a cyan ink, etc.). The silver ink is then added to the other ink to form the metallic ink. As such, in this embodiment, the ink vehicle of the metallic ink includes components of the original ink vehicle (into which the silver colorant is added), and components of the ink vehicle into which the other colorant is added.

It is to be understood that in any of the embodiments of the method and metallic ink disclosed, the amount of the silver and other colorants, and the color of the other colorant may be altered to achieve the desirable color and/or shade of the resulting metallic ink. The various metallic ink colors that may be formed include, but are not limited to, gold, bronze, chrome, copper, black, green and/or the like.

In a non-limiting example, the silver metallic colorant and a yellow colorant are each added to the ink vehicle (or the silver metallic ink is added to the yellow ink) to form a metallic gold-colored ink. In another non-limiting example, the silver metallic colorant, the yellow colorant, and a cyan colorant are each added to the ink vehicle to form the metallic-gold colored ink. It is to be understood that the amounts of silver, yellow and/or cyan colorant may be varied to alter the shade of the resulting metallic ink. Embodiments of the metallic gold ink disclosed herein have substantially the same visual appearance as pure metallic gold ink. In an embodiment in which silver ink is combined with yellow ink, the weight percent ratio of silver ink (or colorant) to yellow ink (or colorant) ranges from about 90:10 to about 30:70. In an embodiment in which the silver ink is combined with the yellow ink and the cyan ink, the weight percent ratio of silver ink to yellow ink to cyan ink ranges from about 90:5:5 to about 40:30:30.

In another embodiment, the silver metallic colorant may be combined with a magenta colorant in an ink vehicle (or the silver metallic ink is combined with a magenta ink) to form a metallic ink exhibiting a metallic copper color. The resultant metallic copper-colored ink exhibits substantially the same visual appearance as pure metallic copper ink. In a non-limiting example in which the silver ink is combined with the magenta ink, the weight percent ratio of silver ink (or colorant) to magenta ink (or colorant) ranges from about 95:5 to about 60:40.

The metallic copper-colored ink may also be formulated from a combination of silver colorant, black colorant, and magenta colorant in an ink vehicle. A desirable copper color may be achieved by including from about 1.0 wt % to about 2.5 wt % of silver colorant, from about 0.1 wt % to about 1.5 wt % of black colorant, and from about 0.1 wt % to about 1.0 wt % magenta colorant. Such a copper-colored ink may also be produced via the combination of silver metallic ink, black ink, and magenta ink. In this embodiment, the resultant copper-colored ink includes a weight percent ratio of silver ink:black ink:magenta ink ranging from about 90:5:5 to about 40:30:30.

Still further, the combination of silver metallic colorant, magenta colorant, and yellow colorant in an ink vehicle (or the combination of silver metallic ink, magenta ink, and yellow ink) also forms an embodiment of the metallic copper-colored ink. In an embodiment, the weight percent ratio of silver colorant or ink:magenta colorant or ink:yellow colorant or ink ranges from about 90:5:5 to about 40:30:30.

Metallic bronze ink may also be formed via embodiments of the method disclosed herein. Any of the forms of silver colorant may be combined with other colorants in an ink vehicle to form the metallic bronze ink. In an embodiment, the metallic bronze-colored ink is formed from the silver nanoparticles dispersion, cyan or magenta pigment or dye, and an ink vehicle. In a non-limiting example, the silver nanoparticle dispersion is added to an ink vehicle (e.g., diethylene glycol, 2-pyrrolidone, isopropyl alcohol, surfactant(s) (e.g., Surfynol® 465), glycerol, 2-aminopropanol, and water) to form silver ink. From about 2.0 wt % to about 3.0 wt % of cyan colorant (dye or pigment) is added to the silver metallic ink to form the metallic bronze-colored metallic ink. In another embodiment, the silver ink is combined with the cyan ink and the magenta ink to form the metallic bronze-colored ink. In a non-limiting example, the silver ink, cyan ink, and magenta ink are combined in a weight percent ratio ranging from about 90:5:5 to about 40:30:30.

Another example embodiment of using the silver nanoparticles dispersion as the silver colorant includes mixing the dispersion with 1) an ink vehicle and 2) about 2.0 wt % to about 3.0 wt % of magenta colorant (either a dye or a pigment) to form a metallic copper-colored ink.

Other shades of metallic-colored inks may also be formed by combining the silver metallic ink or colorant with one or more other colored inks or colorants. As previously described hereinabove, the colorants may be added to a suitable ink vehicle, or the inks may be combined to form the metallic ink disclosed herein. Non-limiting examples of such combinations include the following: silver, cyan, and magenta to form a metallic copper-bronze color; silver, cyan, and black to form a metallic blue-black color; silver, magenta, and black to form a metallic goldish-brown like color; silver, magenta, and yellow to form a metallic gold color; silver, yellow, and black to form a metallic silver-gold color; silver, yellow, and cyan to form a metallic bronze-gold color, and/or other similar combinations.

It is to be understood that use of a pigment/dye-based silver colorant in any of the combinations provided herein may produce colors and/or hues that are slightly different from the colors and/or hues produced using a nanoparticles dispersion as the silver colorant. Furthermore, different embodiments of the method may result in inks having slightly different colors and/or hues. In some embodiments, the colors resemble each other and may be classified as a single color (e.g., gold metallic ink, etc.), but the hue of one of the inks is darker or lighter than the hue of the other ink. For example, the combination of the pigment/dye-based silver metallic ink and the yellow ink produces a gold color that differs from, yet resembles the gold color produced from the nanoparticles dispersion of the silver metallic ink and the yellow ink. These two inks may be classified having a gold color, notwithstanding any visual differences, however slight or large, between them.

Embodiments of the metallic ink may be characterized by particle size, pH, absorbance on a print media surface, surface tension, viscosity, conductivity, particle size measurements, thermal-cycle stability (i.e., ink exhibits thermal and/or temperature stability when cycled between −30° C. and 70° C.), and/or print testing. It is to be understood that desirable characterization results generally indicate ink stability and substantially reliable jettability from an ink cartridge or pen. In an embodiment, the metallic inkjet ink includes a particle size (measured after a thermal-cycle) ranging from about 0.03 μm to about 0.06 μm, a surface tension ranging from about 28 mN/m to about 39 mN/m, a viscosity ranging from about 1.8 cP to about 2.2 cP, and a conductivity greater than 1 mS/cm. In another embodiment, the conductivity of the ink ranges from about 1 mS/cm to about 7 mS/cm.

An embodiment of the method of using the metallic ink composition includes providing the metallic inkjet ink, and establishing the metallic inkjet ink on a substrate. The amount of the ink composition established depends, at least in part, on the desirable image to be formed. The image may include alphanumeric indicia, graphical indicia, or combinations thereof.

Establishing the metallic inks may be accomplished via inkjet printing. As used herein, the term "inkjet printing" refers to non-impact methods for producing images by the deposition of ink droplets in a pixel-by-pixel manner onto an image-recording medium in response to appropriate commands, such as digital signals. Various methods may be employed to control the deposition of ink droplets on the image-recording medium to form the desired image. Non-limiting examples of suitable inkjet printing processes include thermal inkjet printing, piezoelectric inkjet printing, or continuous inkjet printing. It is to be understood that some embodiments of the metallic inks disclosed herein may be particularly suitable for thermal inkjet printers. In some embodiments, the performance of the metallic ink may be enhanced when printed with a thermal inkjet printer. Suitable printers include portable thermal or piezoelectric inkjet printers (e.g., handheld printers, arm mountable printers, wrist mountable printers, etc.), desktop thermal, piezoelectric or continuous inkjet printers, or combinations thereof.

Without being bound by any theory, it is believed that the desirable metallic luster of the metallic inks disclosed herein may be achieved when particular media are used. It is to be understood that any suitable substrate may be selected (e.g., plain paper, or polymeric media), but that certain media may further enhance the luster of the printed inks. In an embodiment, the specular reflection from relatively smooth and glossy media (such as coated paper, photo paper, or polymeric media) may enhance the metallic luster of the metallic inks. Other media that advantageously enhance the metallic luster of embodiments of the ink include porous media, vinyl media, and transparencies. As such, the type of print media selected may significantly affect the aesthetic results of the metallic ink printed thereon.

Without being bound by any theory, it is also believed that the print mode selection may affect the level of metallic luster. Non-limiting examples of suitable inkjet printing modes include at least the normal printing mode.

To further illustrate embodiment(s) of the present disclosure, various examples are given herein. It is to be understood that these examples are provided for illustrative purposes and are not to be construed as limiting the scope of the disclosed embodiment(s).

EXAMPLES

Nine inks (labeled Inks 1, 2, 3 . . . 9 herein) were prepared and tested using an HP deskjet 5550 or a 970 cxi printer. Inks 1-4 were prepared by combining a preformed silver ink (i.e., a pigmented silver metallic colorant and an ink vehicle) with yellow inks (i.e., yellow pigment and an ink vehicle). Inks 1-4 had a weight percent ratio of silver ink to yellow ink of 90:10, 80:20, 70:30 and 60:40, respectively. Inks 5-8 were prepared by combining a preformed silver ink with a yellow colorant. Inks 5-8 had a weight percent ratio of silver ink to yellow colorant of 90:10, 80:20, 70:30 and 60:40, respectively. Ink 9 was a silver metallic ink with no additional colorants, and as such, was a comparison ink.

Inks 1-9 were tested according to the following procedures: (1) The pH of the inks was measured and adjusted so that all of the inks had a similar basic pH. Any pH adjustments were made by adding 1M sodium hydroxide or 1M hydrochloric acid to the ink, thereby obtaining a more basic or acidic pH, respectively. (2) Other physical properties (e.g., pH, surface tension, viscosity, particle size, conductivity) of each of inks 1-9 were measured. (3) A thermal-cycle analysis was performed on the silver ink (Ink 9) and the eight sample inks (Inks 1-8). (4) The particle size of each of the inks (Inks 1-9) was measured after the thermal-Cycle, and those results were compared to the particle size measurements taken prior to the thermal-cycle. The data for the measured physical properties of the nine inks are provided in Table 1.

TABLE 1

Physical Properties of Sample Inks 1-8 and Comparative Sample Ink 9

| Sample | Initial pH | Final pH | Surface Tension (mN/m) | Viscosity (cP) | Particle Size - Before Thermal-Cycle (nm) | Particle Size - After Thermal-Cycle (nm) | Conductivity (mS/cm) |
|---|---|---|---|---|---|---|---|
| Ink 1 | N/A | 6.99 | 29.3 | 1.89 | 8.1 | 34.4 | 1.1 |
| Ink 2 | N/A | 6.83 | 29.2 | 1.96 | 13.4 | 41.1 | 1.8 |
| Ink 3 | N/A | 6.71 | 28.9 | 2.06 | 24 | 40.6 | 2.4 |
| Ink 4 | N/A | 6.69 | 28.8 | 2.18 | 28 | 42.3 | 3 |
| Ink 5 | N/A | 6.59 | 36.6 | 2.00 | 39 | 48.7 | 2.5 |
| Ink 6 | N/A | 6.33 | 37.6 | 1.95 | 45.3 | 50.1 | 4.5 |
| Ink 7 | N/A | 6.26 | 37.7 | 1.90 | 45.4 | 58.8 | 5.6 |
| Ink 8 | N/A | 6.20 | 38.6 | 1.91 | 45.1 | 52.4 | 6.8 |
| Ink 9 | 6.54 | N/A | 35.2 | 2.05 | 23 | 37.7 | 0.25 |

Table 1 provides the physical properties of the ink samples 1-9. As can be seen from the data provided in Table 1, inks 7 and 8 have a particle size measurement (both before and after the thermal cycle) that suggests that these inks are substantially stable. While inks 1-4 demonstrated substantial particle growth during the thermal cycle, the resulting particles were less than 60 nm, and were fully dispersed. All of the other properties provided in Table 1 for inks 1-8 were acceptable with respect to suitable inkjet printing performance.

Inks 1-8 were filled into ink pens and printed on various print media including Hewlett-Packard premium photo paper, Hewlett-Packard advanced photo paper, Hewlett-Packard brochure paper, and other commercially available porous glossy papers. The metallic luster and overall print quality with respect to bleed, edge acuity and optical density were visually inspected, quantified, and rated using a scale of 0 to 6, where a score of 2 or lower indicates poor metallic luster/print quality, a score of 3 to 4 indicates fairly good metallic luster/print quality, and a score of 5 to 6 indicates very good metallic luster/overall print quality.

Each of inks 1-8 exhibited high levels of optical density and metallic luster, especially on HP advanced photo paper and other photo-like papers. In particular, Inks 1-8 printed on HP advanced photo paper scored from 3 to 6. These results suggest that the inks disclosed herein have fairly to very good metallic luster/overall print quality. This is comparable to the performance of the silver ink (Ink 9) (which was printed and tested in a similar fashion), as illustrated in Table 2 below.

TABLE 2

Metallic Luster and Image Quality Ranking (Scale = 0-6)

| Sample | Metallic Luster | Image Quality |
|--------|-----------------|---------------|
| Ink 1 | 6 | 5 |
| Ink 2 | 5 | 5 |
| Ink 3 | 4 | 5 |
| Ink 4 | 3 | 4 |
| Ink 5 | 6 | 5 |
| Ink 6 | 5 | 5 |
| Ink 7 | 5 | 5 |
| Ink 8 | 5 | 5 |
| Ink 9 | 6 | 6 |

Various printing modes were also tested using the prepared ink samples (Inks 1-8). The print modes tested included fast-draft mode, everyday mode, normal mode, and best mode on Hewlett-Packard deskjet 2210, 5550, and 6540 printers. The best results were achieved using a print mode of at least normal (i.e., normal print mode through the best print mode).

Embodiments of the inks disclosed herein may be obtained relatively cost effectively by using silver metallic colorant and an other colorant in an ink vehicle to form a metallic ink having a desirable hue. The metallic inks disclosed herein advantageously exhibit relatively high levels of luster, relatively low levels of toxicity, and are suitable for use in inkjet printing processes.

While several embodiments have been described in detail, it will be apparent to those skilled in the art that the disclosed embodiments may be modified. Therefore, the foregoing description is to be considered exemplary rather than limiting.

What is claimed is:

1. A metallic inkjet ink, comprising:
   a silver metallic pigment, a water-based dispersion of silver nanoparticles, or combinations thereof;
   an other colorant selected from a pigment, a dye, and combinations thereof; and
   at least one ink vehicle.

2. The metallic inkjet ink as defined in claim 1 wherein the percent ratio of the silver metallic pigment, the water-based dispersion of silver nanoparticles, or combinations thereof to the other colorant ranges from about 95:5 to about 30:70.

3. The metallic inkjet ink as defined in claim 1 wherein the other colorant is selected from yellow, magenta, a combination of black and magenta, a combination of magenta and yellow, a combination of cyan and magenta, a combination of cyan and black, a combination of yellow and black, and a combination of yellow and cyan.

4. The metallic inkjet ink as defined in claim 1 wherein the other colorant is selected from magenta or cyan, and wherein the magenta or cyan colorant is present in an amount ranging from about 2 wt % to about 3 wt %.

5. The metallic inkjet ink as defined in claim 1 wherein the ink vehicle includes:
   at least one solvent present in an amount ranging from about 5 wt % to about 25 wt %;
   at least one surfactant present in an amount ranging from about 0.1 Wt % to about 1 wt %; and water.

6. The metallic inkjet ink as defined in claim 5 wherein the at least one solvent is selected from 2-pyrrolidone, glycerin, isopropyl alcohol, 1,5-pentanediol, 1,6-hexanediol, tetraethylene glycerol, diethylene glycol, 2-aminopropanol, neopentyl alcohol, ethoxylated glycerol, and combinations thereof.

7. The metallic inkjet ink as defined in claim 1 having a surface tension ranging from about 28 mN/m to about 39 mN/m.

8. The metallic inkjet ink as defined in claim 1 having a viscosity ranging from about 1.8 cP to about 2.2 cP.

9. The metallic inkjet ink as defined in claim 1 having a conductivity greater than 1 mS/cm.

10. A method of forming a metallic inkjet ink, comprising:
    providing an ink vehicle;
    adding a silver metallic pigment, a water-based dispersion of silver nanoparticles, or combinations thereof to the ink vehicle; and
    adding an other colorant to the ink vehicle, wherein the other colorant is selected from a pigment, a dye, and combinations thereof.

11. The method as defined in claim 10 wherein the silver metallic pigment, the water-based dispersion of silver nanoparticles, or combinations thereof is added to the ink vehicle, and wherein prior to adding the other colorant to the ink vehicle, the method further comprises:
    adding the other colorant to a second ink vehicle; and
    adding the other colorant in the second ink vehicle to the ink vehicle containing the silver metallic pigment, the water-based dispersion of silver nanoparticles, or combinations thereof.

12. The method as defined in claim 10, further comprising combining the silver metallic pigment, the water-based dispersion of silver nanoparticles, or combinations thereof and the other colorant prior to adding them to the ink vehicle.

13. The method as defined in claim 10 wherein the other colorant is selected from a pigment, a dye, and combinations thereof.

14. The method as defined in claim 10 wherein the other colorant is selected from yellow, magenta, a combination of black and magenta, a combination of magenta and yellow, a combination of cyan and magenta, a combination of cyan and black, a combination of yellow and black, and a combination of yellow and cyan.

15. The method as defined in claim 10 wherein the silver metallic pigment, the water-based dispersion of silver nanoparticles, or combinations thereof is added to the ink vehicle prior to the addition of the other colorant.

16. A method of forming a metallic image on a substrate, comprising:
providing an inkjet ink including:
an ink vehicle;
a silver metallic pigment, a water-based dispersion of silver nanoparticles, or combinations thereof; and
an other colorant selected from a pigment, a dye, and combinations thereof; and
establishing the inkjet ink on the substrate.

17. The method as defined in claim 16 wherein establishing is accomplished via thermal inkjet printing, piezoelectric inkjet printing, or continuous inkjet printing.

18. The method as defined in claim 16 wherein the substrate is photo paper, porous media, polymer-base media, vinyl paper, or transparent media.

19. A metallic inkjet ink, comprising:
a silver metallic colorant;
an other colorant selected from a pigment, a dye, and combinations thereof; and
at least one ink vehicle.

20. The metallic inkjet ink as defined in claim 19 wherein the silver metallic colorant is selected from a silver metallic pigment, a water-based dispersion of silver nanoparticles, and combinations thereof.

* * * * *

UNITED STATES PATENT AND TRADEMARK OFFICE
CERTIFICATE OF CORRECTION

PATENT NO. : 7,615,111 B2
APPLICATION NO. : 11/736762
DATED : November 10, 2009
INVENTOR(S) : Christopher O. Oriakhi It is certified that error appears in the above-identified patent and that said Letters Patent is hereby corrected as shown below:

In column 10, line 20, in Claim 5, delete "Wt" and insert -- wt --, therefor.

Signed and Sealed this

Fifteenth Day of June, 2010

David J. Kappos
*Director of the United States Patent and Trademark Office*